July 15, 1941.  W. H. STRYKER  2,249,439
GOVERNOR
Filed Aug. 23, 1937  3 Sheets-Sheet 1
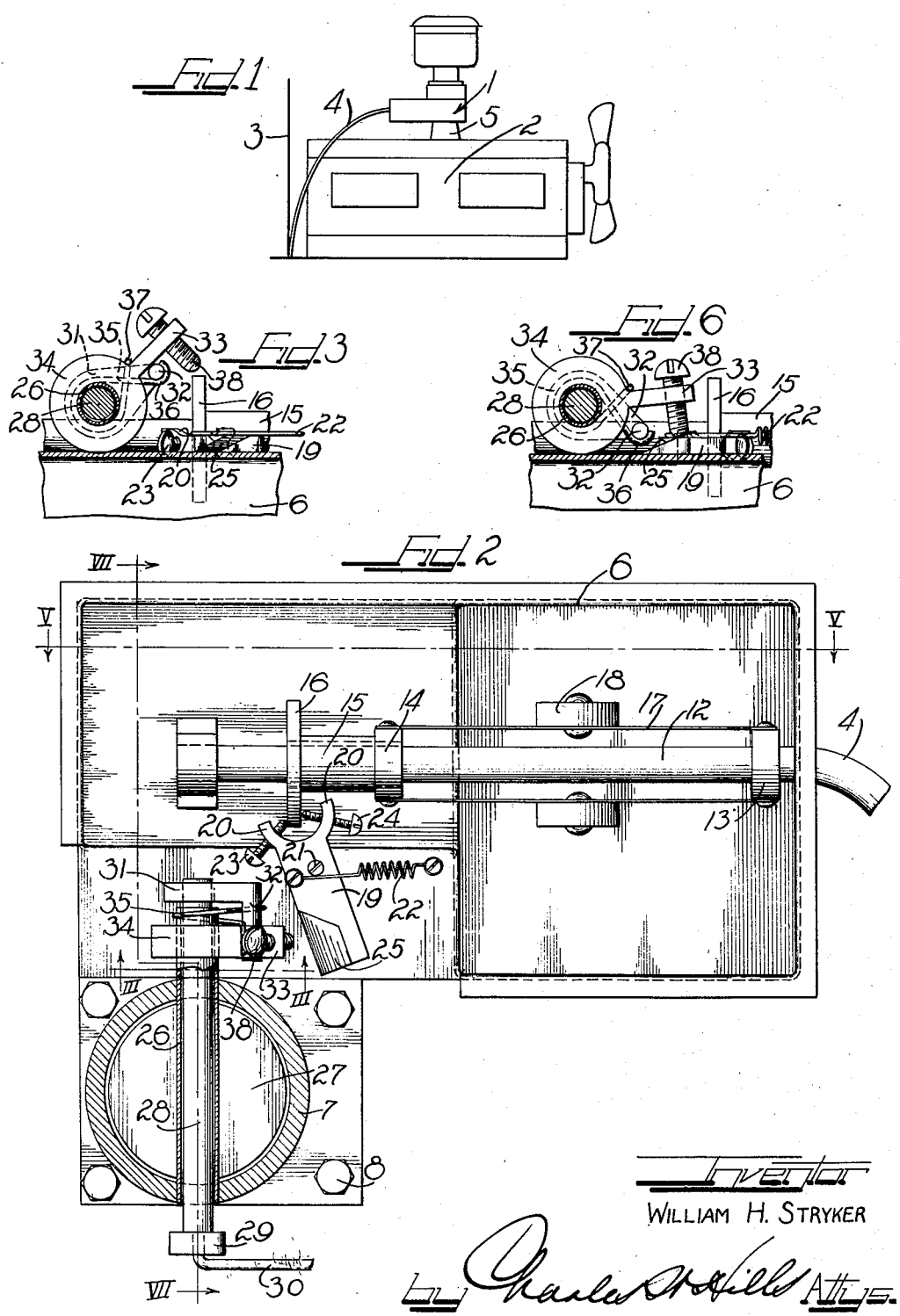
Inventor
WILLIAM H. STRYKER July 15, 1941.  W. H. STRYKER  2,249,439
GOVERNOR
Filed Aug. 23, 1937  3 Sheets-Sheet 2
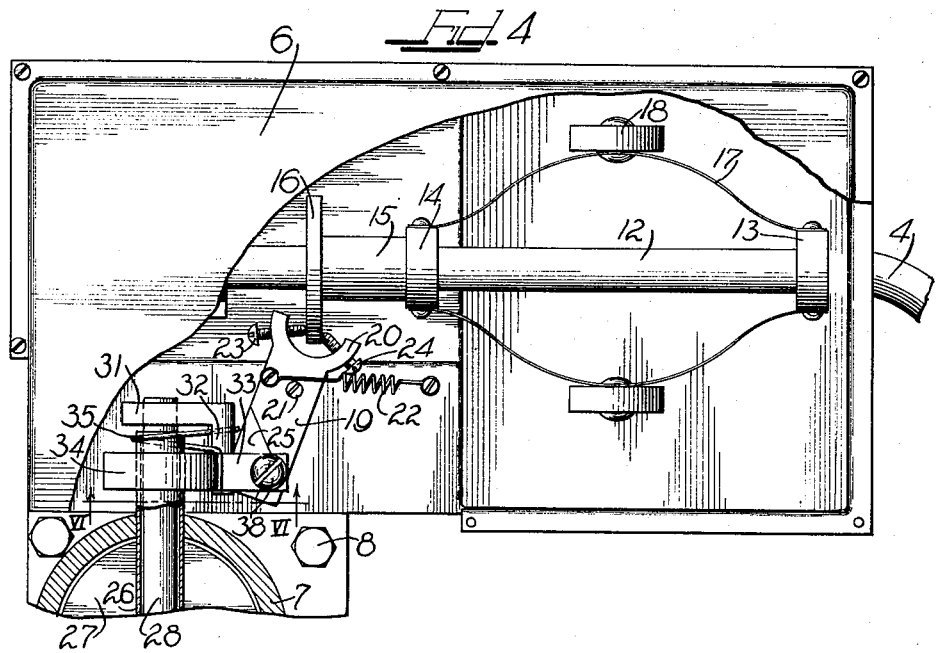
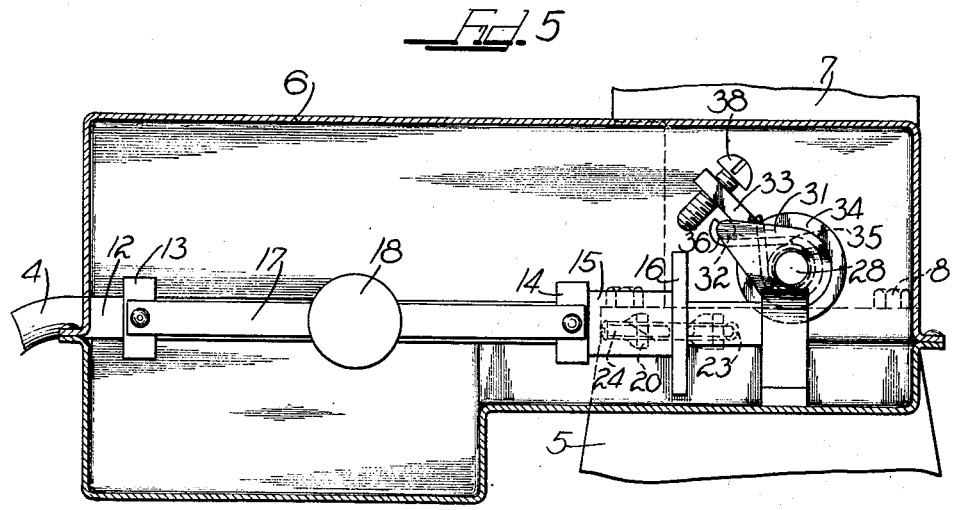
Inventor
WILLIAM H. STRYKER

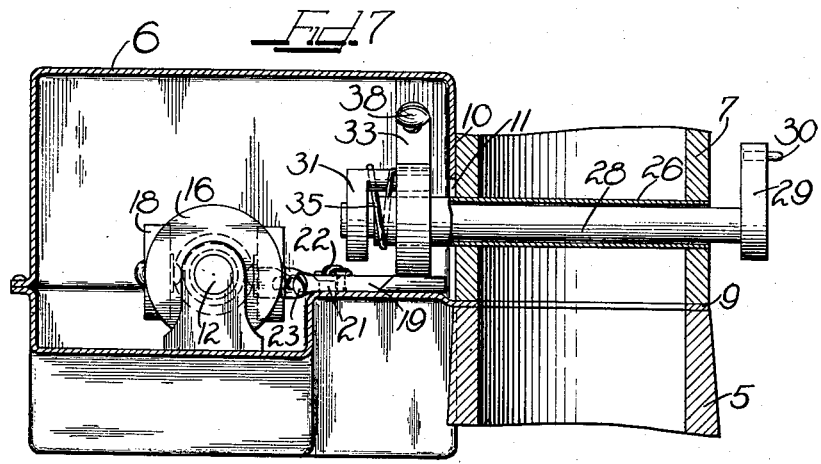

Patented July 15, 1941

2,249,439

UNITED STATES PATENT OFFICE 2,249,439

GOVERNOR

William H. Stryker, Elmhurst, Ill., assignor, by mesne assignments, to William H. Stryker and Emma G. Stryker, Elmhurst, Ill., as joint tenants Application August 23, 1937, Serial No. 160,389

13 Claims. (Cl. 123—108)

This invention relates to improvements in governors, and more particularly to the type of governors used on vehicles driven by internal combustion engines for the purpose of limiting the speed of the vehicle, although the invention may have other uses and purposes as will be apparent to one skilled in the art.

In the use of governors for controlling the speed of vehicles driven by internal combustion engines, electrical motors or other power means, it is desirable to have a governor which effectively prevents the driver from over-riding the governor or otherwise misusing it without breaking the seal on the governor housing and thus revealing his wrongful operation to those in authority. However, it is also desirable to give this driver the full benefit of his power plant when the need arises. Therefore, it is desirable to have the governor responsive to the speed of the vehicle itself, rather than responsive to the load carried or to the motor or engine speed. A governor responsive to a vehicle load is, in most instances, unnecessary since the advent of pneumatic tires for trucks and heavy vehicles. A governor which is responsive to the engine or motor speed, as distinguished from the vehicle speed, is also unsatisfactory in that it prevents racing of the engine in the event adjustments are necessary, it prevents enough pulling power of the engine to free the rear wheels at times, if they are stuck in the mud, and it frequently prevents a sufficiently fast engine speed to pull a truck or the like up a steep grade, in first or second gear.

I am aware that in the past some governors have been developed which are responsive to the speed of the vehicle itself. However, these formerly known governors of this character have been open to certain objections. For example, some of them resulted in an opening of the ignition, and such is dangerous because the muffler would fill with raw gas, and when the ignition circuit was again closed, the resultant explosion would be liable to burst the muffler. In other instances, the devices were clumsy and unwieldly to install, too complicated to be practical, or required a special carbureter. In still other instances, the force of the driver's foot upon the accelerator acted directly against the governor, and it is impossible to adjust the governor while the engine is running.

With the foregoing in mind, it is an object of the present invention to provide a governor responsive to the speed of the vehicle itself for controlling the power plant of the vehicle, which governor is simple in construction, embodying relatively few parts, positive in action, and durable.

Another object of the invention is the provision of such a governor which may readily be connected to substantially any internal combustion engine, and which does not require any special carbureter.

A further object of the invention is the provision of a governor for a motor vehicle, wherein there is substantially a constant pressure or resistance against the action of the governor, regardless of the amount of pressure exerted by the operator or driver upon the fuel feed mechanism.

Also an object of the invention is the provision of a governor for an internal combustion engine driven vehicle, so constructed that it is impossible for the driver to over-ride the governor by quick actuation of the fuel feed mechanism.

Another feature of this invention is the provision of a governor for a vehicle driven by an internal combustion engine, which governor necessitates no additional restriction in the fuel intake of the engine.

It is also a feature of the invention to provide a governor for a vehicle powered by an internal combustion engine, wherein the customary fuel feed operates against an intermediate pressure means which in turn operates the throttle valve of the engine, and the governor controls the operation of the throttle valve, the governor acting only against said intermediate means regardless of the pressure or force exerted by the operator on the usual fuel feeding means.

While some of the more salient features, characteristics and advantages of the present invention have been above pointed out, others will become apparent from the following disclosures, taken in conjunction with the accompanying drawings, in which:

Figure 1 is a fragmentary diagrammatic elevational view of the engine compartment of a vehicle, showing a governor embodying principles of the present invention associated with the engine;

Figure 2 is an enlarged plan view, partly in section and partly in elevation, of the governor and its housing, with the cover of the housing removed;

Figure 3 is a fragmentary vertical sectional view taken substantially as indicated by the line III—III of Figure 2, looking in the direction of the arrows;

Figure 4 is a fragmentary, part plan and part plan sectional view, similar to Figure 2, but showing the governor in operation;

Figure 5 is a fragmentary vertical sectional view taken substantially as indicated by the line V—V of Figure 2;

Figure 6 is a fragmentary vertical sectional view taken substantially as indicated by the line VI—VI of Figure 4;

Figure 7 is a fragmentary vertical sectional view taken substantially as indicated by the staggered section line VII—VII of Figure 2; and Figure 8 is a fragmentary view, partly in plan and partly in section, illustrating a modified form of construction.

As shown on the drawings:

The illustrated embodiment of the present invention, as seen in Figures 1 to 7, inclusive, and generally indicated by numeral 1 in Figure 1, is shown associated with an internal combustion engine 2 in the engine compartment defined by a dash 3 of any suitable form of vehicle, such as an automobile. The governor is driven through a flexible shafting arrangement 4 which may be connected to the speedometer shaft or to the other mechanism in substantially the same location as the speedometer, so that the shafting 4 is driven by the same element as drives the speedometer, to make the governor directly responsive to the speed of the vehicle as distinguished from the engine speed. In this instance, the invention is shown in connection with a downdraft carbureter of any suitable or desirable construction.

The governing mechanism may be enclosed in any suitable form of housing 6, the respective parts of which may be secured together in any desirable manner, and if a seal is desired, such may be attached in any well-known manner. Where there is room for such an installation, the housing 6 may be associated with the carbureter intake, as seen best in Figure 7. In this figure, it will be seen that a fuel intake conduit 5 is associated with the carbureter 7 and held connected therewith by any suitable means, such as bolts 8 (Figures 2 and 5), and that a portion 9 of the housing 6 is clamped between the carbureter 7 and intake 5, and acts as a supporting bracket. The bracket portion 9 is provided with an aperture in registry with the mixture passage in the manifold 5 and the mixture outlet in the carburetor 7 so as not to interfere with the flow of mixture from the carbureter to the manifold. The bracket 9 is solid, that is, the metal is continuous from its upper to its lower surface without having any hollows or mechanism within it, so that it is sufficiently strong even though it is so thin that its insertion between the carbureter and manifold causes practically no change in the position of the carbureter. Another portion of the housing 6 extends upwardly in abutment with the carburetor 7, as indicated at 10, and this part is provided with a suitable opening 11, through which extends a control for a throttle valve to be later described herein.

With reference more particularly to Figures 2 and 4, it will be seen that the governor mechanism includes a governor shaft 12 connected in any suitable manner to be driven by the aforesaid flexible shafting 4. This shaft is, of course, journaled in any suitable manner within the casing 6. Adjacent the outer end of the shaft, a collar 13 is fixed to the shaft, and adjacent the inner end of the shaft, a similar collar 14 floats on the shaft. This collar 14 is preferably integral with a sleeve 15 having an outstanding flange 16. Connecting the two collars 13 and 14 is a plurality of fly-ball governor elements, each comprising the usual spring strip 17 and a suitable weight 18. In this instance, I have illustrated the weight as being on the outside of each respective strip, so that a greater bending of the strip may result.

Mounted on a suitable portion of the housing 6 in position to be actuated by the aforesaid flange 16 is a stop or control member 19 having a bifurcated end 20 and being pivotally mounted on a stud 21 or the equivalent. This member is urged in either direction by a spring 22 or the equivalent attached to the element and anchored to the housing at the opposite end. A pair of screws 23 and 24 each extending through one of the bifurcations 20 determines the movement of the stop member by the flange 16, and obviously the time and distance of movement may be controlled by adjusting one or both of these screws. During operation, as the fly-ball elements of the governor expand, the flange 16 will be drawn to the right, as seen in Figure 2, to the position seen in Figure 4, thus abutting the screw 24 and pivoting the member 19 to the position seen in Figure 4. It will be noted from these figures that the spring 22 urges this member in either direction after it has been moved sufficiently to pass dead-center. The outer or working end of the member 19 is provided, adjacent one edge, with a distinct bevel 25 for a purpose that will later appear.

In associating the present governing mechanism with substantially any carbureter, it is only necessary to substitute a throttle valve mounting for that already in the carbureter intake. No added restriction is provided in the carbureter intake by this substitution, the parts being so sized as to particularly avoid additional restriction.

With this end in mind, and with reference more particularly to Figure 2, it will be seen that a tube 26 is substituted for the original throttle valve shaft, and this tube is preferably of the same diameter as the original shaft. A suitable throttle valve 27 is fixed to the tube in the usual manner. A new and smaller throttle valve shaft 28 extends through the tube and therebeyond at each end. At the outer end of the throttle valve shaft, an arm 29 is fixed to the shaft, and a suitable actuating element 30 is connected with the arm and extends to the accelerator foot pedal or equivalent fuel feeding means on the particular vehicle.

An intermediate connection is established between the throttle valve shaft and the throttle itself. On the inner end of the throttle valve shaft 28, a crank arm 31 is fixed, and a projection 32 integral with this crank arm extends beneath a projecting arm 33 on a collar 34 which is fixed to the tube 26. A suitable resilient element, such as a coil spring 35, has one end anchored around the projection 32 as seen at 36 in Figure 3, and the other end anchored on top of the projection 33 as seen at 37. Consequently, regardless of the pressure put on the control element 30 by the driver of the vehicle, the only pressure that can be put on the throttle valve is that of the spring 35, since the tube 26 is actuated through the spring from the throttle valve shaft 28. It will be noted that the projection 33 on the collar 34 has a stud screw 38 or the equivalent extending therethrough in position to be contacted by the beveled surface 25 on the stop member 19 when the vehicle speed is such as to cause sufficient actuation of the governor mechanism.

The operation of the entire mechanism is extremely simple, positive and fool-proof. In Figures 2, 3, 5 and 7, the mechanism is shown in an inoperative position, while in Figures 4 and 6, it is shown in operative position.

As long as the vehicle is idle, or the vehicle speed is below a predetermined amount for which the governor mechanism has been adjusted, the mechanism will remain substantially in the position seen in Figure 2, but when the vehicle speed exceeds such predetermined amount, the fly-ball members of the governor expand, drawing the sleeve 15 to the right on the governor shaft 12. This moving of the collar proceeds against the action of the spring 22 until the dead-center position of the stop member 19 has been passed, when the spring 22 moves the stop member 19 to the position seen in Figure 4 with a positive and substantially snap-like action. Such movement causes the beveled portion 25 of the stop member to lodge under the aforesaid stud screw 38 and prevents any further turning movement of the tube 26 and opening of the throttle valve 27. As seen in Figure 6, the throttle valve shaft 28 may be moved beyond this point, with the stop member 19 overcoming the action of the coil spring 35 and preventing any further movement of the throttle valve.

In the event the driver of the vehicle attempts to over-ride the governor by suddenly moving the throttle valve to wide open position, before the governor mechanism has had time to act, the governor mechanism will act nevertheless and the beveled portion 25 will engage beneath the stud screw 38 and force the stud screw and throttle valve back to the position for which the mechanism has been adjusted. Of course, the vehicle may move faster than the predetermined speed when proceeding down-hill, the additional speed coming from coasting and not from the engine. At the same time, it will be noted that as long as the vehicle remains idle, or moves at a slow speed, the throttle valve may be opened to its fullest extent and the motor driven at any desirable speed. This enables the driver of the vehicle to get all the pull possible from the engine in the event one or more wheels of the vehicle are temporarily stuck in the mud, or the driver is proceeding up a steep incline in first or second gear. In other words, the driver is at all times enabled to obtain the utmost power from his engine when the same is needed, but he is unable to cause the engine to drive the vehicle at a faster rate of speed than a predetermined amount for which the governing mechanism has been adjusted.

It will also be especially noted that at no time is the driver of the vehicle applying a direct force against the governor, regardless of how hard the fuel feed of the vehicle may be operated. The governing mechanism never acts at any time against a greater pressure than that provided by the spring 35. Therefore, the governing mechanism is not very susceptible to injury and is extremely durable.

Ample adjustments are provided to cause operation of the governing mechanism at substantially any desirable vehicle speed. Any one or more than one of the screws 23, 24 and 38 may be preset to a desired position to effect substantially any desired adjustment.

In the event it is not feasible with a particular vehicle or vehicle engine construction to mount the housing for the governing mechanism in association with the carbureter, as above described, a relatively small portion of the mechanism may be mounted adjacent the carbureter and the remainder of the mechanism may be located at a more roomy point. In such an instance, the connection between the two portions of the mechanism would preferably be in the form of a Bowden wire or the equivalent. Such an arrangement is illustrated in Figure 8.

In this instance, the general construction of the governor shaft, the fly-ball elements, and the stop member are substantially the same as previously described, and the general construction of the throttle valve and the operating mechanism therefor are substantially the same as previously described. However, a housing 6a similar to the aforesaid housing 6 may be arranged around the governor shaft and its associated mechanism and disposed in any desirable or suitable location where there is sufficient room to accommodate it handily. Another housing 6b may be disposed around the smaller mechanism including the actuating means for the throttle valve and a second stop member to prevent opening the throttle valve beyond a predetermined point. This housing 6b will, of course, be associated with the carbureter, as above described.

I have illustrated a flexible shafting 4a for driving the governor shaft 12 as connected to the other end of the governor shaft, but insofar as operation is affected, it makes no difference which end the governor shaft may be driven from. The flexible shafting 4a is, of course, associated directly with the speedometer shaft or is connected with the portion of the mechanism which drives the speedometer shaft, as may be deemed more feasible. In this instance, however, the stop member associated with the governor shaft to be actuated by the flange 16, designated 19a, does not include the beveled edge portion 25 as is the case with the stop member 19 above described. The stop member 19a does not contact the stud screw associated with the throttle valve, and therefore need not have such a beveled edge.

Another stop member 39 must be employed for this purpose, due to the distance between the governor shaft and the throttle valve mechanism, and this stop member 39 is provided with a beveled edge 25a similar to the edge 25. The stop member 39 is pivoted to a suitable portion of the housing 6b, as indicated at 40, and the actuation of the stop member 39 is controlled by the stop member 19a, so that both of these members act in unison. In this instance, the stop members 19a and 39 are shown connected by a suitable Bowden wire 41 fixedly attached to the member 19a, as indicated at 42, and fixedly attached to the member 39, as indicated at 43.

With the exception that the structure in Figure 8 does not have the advantage of being encased in a single housing and does contain a few additional parts, it functions the same and possesses all of the other advantages and features of the structure disclosed and described in connection with Figures 1 to 7, inclusive.

From the foregoing, it is apparent that I have provided a governor mechanism for association with a vehicle, which mechanism is simple in construction and operation, highly durable, economical to manufacture, positive in operation, and still permits the driver of the vehicle to utilize maximum engine power where needed but effectively prevents the driver from operating the vehicle above a predetermined speed solely by means of the vehicle engine.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In governing mechanism for an internal combustion engine, manual control means, a throttle valve, and resilient means establishing connection between said manual control means and said valve, and governing means operable upon a predetermined speed to prevent further opening movement of said throttle valve against the action of said resilient means, said governing means including a member movable with said throttle valve and a speed responsive member movable at an angle to and into the path of movement of said first member and having a cam surface for engaging and moving said first member.

2. In governing mechanism for an internal combustion engine, manual control means, a throttle valve, and resilient means establishing connection between said manual control means and said valve, a member fixed to and moving with said valve, and governing means operable upon a predetermined speed and having a cam surface movable transversely to and into the path of said member to prevent further opening movement of said throttle valve, the arrangement being such that said governing means acts only against the pressure of said resilient means regardless of the pressure imposed on said manual control means.

3. In combination with an internal combustion engine, manual control means, a throttle valve, resilient means connecting said manual control means and the throttle valve to actuate the latter from the former, projecting means fixedly associated with the throttle valve and movable therewith, and governing means including a stop member movable transversely to the path of movement of said projecting means and having a portion for engagement with said projecting means to limit movement of said throttle valve in one direction, said portion having an engaging surface at an oblique angle to its direction of movement.

4. In combination with an internal combustion engine, manual control means, a throttle valve, resilient means connecting said manual control means and the throttle valve to actuate the latter from the former, projecting means fixedly associated with the throttle valve and movable therewith, and governing means including a stop member movable transversely to the path of movement of said projecting means and having a portion for engagement with said projecting means to limit movement of said throttle valve in one direction, said portion having an engaging surface at an oblique angle to its direction of movement for raising said projecting means and throttle valve against the action of said resilient means in the event of a sudden actuation of the fuel feeding means and acting only against said resilient means regardless of the pressure on said fuel feeding means.

5. In combination with an engine, speed control means, operating means therefor, resilient means establishing a driving connection between said control and operating means, and governing mechanism operable when a predetermined speed is reached to block further advance movement of said speed control means, said governing means including a member movable with said speed control means and a speed responsive member movable at an angle to and into the path of movement of said first member and having a cam surface for engaging and moving said first member.

6. In combination with an engine, speed control means, operating means therefor, resilient means establishing a driving connection between said control and operating means, and governing mechanism operable when a predetermined speed is reached to block further advance movement of said speed control means, said governing means including a member movable with said speed control means and a speed responsive member movable at an angle to and into the path of movement of said first member and having a cam surface for engaging and moving said first member, and said governing mechanism acting against only the pressure of said resilient means regardless of the pressure put on said operating means.

7. In combination with an internal combustion engine, a throttle valve, a tube fixedly carrying said valve, an actuating shaft extending freely through said tube, resilient means establishing a driving connection between said shaft and said tube, and governing mechanism operable at a predetermined speed to block further movement of said tube against the action of said resilient means.

8. In combination with an internal combustion engine, a throttle valve, a tube fixedly carrying said valve, an actuating shaft extending freely through said tube, resilient means establishing a driving connection between said shaft and said tube, a projecting element carried by said tube, and a governing mechanism including a stop member movable in the path of said projecting element to limit the movement of said tube.

9. In combination with an internal combustion engine, a throttle valve mechanism, and a governing mechanism including a member movable in proportion to the speed of said governing mechanism, and a pivotal cam element connected to said member and movable thereby in either direction along a path intersecting at an angle the path of a part of said throttle valve mechanism to limit opening movement of the throttle valve.

10. In combination with an internal combustion engine, a throttle valve mechanism, a movable member having a cam surface movable along a path intersecting and at an angle to the path of movement of a part of said mechanism to limit the movement of the throttle valve, governing mechanism including a member movable in response and proportion to the speed of said governing mechanism, and means connecting said members to cause their operation in unison.

11. In a governing mechanism for controlling an internal combustion engine having a fuel control member, speed responsive governing means, and a stop member movable by said means into and out of a position to block movement of said fuel control member in one direction, a line perpendicular to the blocking surface of said stop member being at a substantial angle to the plane of movement thereof.

12. In a governing mechanism for controlling an internal combustion engine having a fuel control member, speed responsive governing means, and a stop member movable by said means into and out of a position to block movement of said fuel control member in one direction, and resilient means to urge said stop member away from a predetermined median position irrespective of which side of said position said member may be situated.

13. In a governing mechanism for an internal combustion engine having a fuel control member, speed responsive governing means, a stop member movable by said means into and out of a position to block movement of said fuel control member in one direction, a line perpendicular to the blocking surface of said stop member being at a substantial angle to the plane of movement thereof, and adjustment means carried by said stop member to predetermine the movement thereof into and out of effective position.

WILLIAM H. STRYKER.